United States Patent [19]

von Brachel et al.

[11] 4,247,456
[45] Jan. 27, 1981

[54] WATER-INSOLUBLE MONOAZO PYRIDONE DYE

[75] Inventors: Hanswilli von Brachel, Leopoldshöhe; Ernst Heinrich, Frankfurt am Main; Otto Grawinger, Frankfurt am Main; Karl Hintermeier, Frankfurt am Main; Horst Kindler, Frankfurt am Main, all of Fed. Rep. of Germany

[73] Assignee: Cassella Aktiengesellschaft, Frankfurt am Main, Fed. Rep. of Germany

[21] Appl. No.: 743,283

[22] Filed: Nov. 19, 1976

Related U.S. Application Data

[60] Continuation-in-part of Ser. No. 625,328, Oct. 23, 1975, abandoned, which is a division of Ser. No. 259,781, Jun. 5, 1972, Pat. No. 3,957,749, which is a continuation of Ser. No. 882,285, Dec. 4, 1969, abandoned.

[51] Int. Cl.² ............... B09B 29/36; D06P 1/18; D06P 3/24; D06P 3/54
[52] U.S. Cl. .................. 260/156; 546/275; 546/283; 546/286; 546/288; 546/290; 546/298
[58] Field of Search ............ 260/156; 8/41 B, 41 C

[56] References Cited

U.S. PATENT DOCUMENTS

| | | |
|---|---|---|
| 2,431,190 | 11/1947 | Morgan . |
| 3,487,066 | 12/1969 | Ritter et al. . |
| 3,640,674 | 2/1972 | Berrie et al. . |
| 3,657,214 | 4/1972 | Berrie et al. . |
| 3,905,951 | 9/1975 | Berrie et al. . |

Primary Examiner—Floyd D. Higel
Attorney, Agent, or Firm—Connolly and Hutz

[57] ABSTRACT

Water-insoluble monoazo dyes of the formula

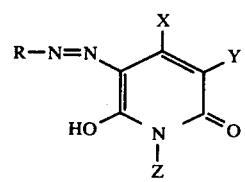

produced by reacting a diazotized amine of the benzene, naphthalene, diphenyl, diphenylmethane or heterocyclic series which is free from water solubilizing groups with the appropriate 6-hydroxy-2-pyridone and the utility thereof for the dyeing and printing of synthetic fabric materials to yellow to red shades having excellent fastness to light and sublimation.

1 Claim, No Drawings

WATER-INSOLUBLE MONOAZO PYRIDONE DYE

CROSS-REFERENCE TO RELATED APPLICATION

This application is a continuation-in-part of application Ser. No. 625,328 filed Oct. 23, 1975, now abandoned, which in turn is a division of application Ser. No. 259,781 filed June 5, 1972 (now U.S. Pat. No. 3,957,749) which in turn is a continuation of application Ser. No. 882,285 filed Dec. 4, 1969 and now abandoned.

The present invention relates to new water-insoluble monoazo dyes of the formula

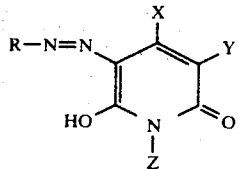

wherein R is the residue of a benzene, naphthalene, diphenyl, diphenylmethane or heterocyclic diazo component which is free from water-solubilizing groups; X is hydrogen, alkyl containing 1 to 6 carbon atoms, preferably methyl, alkoxycarbonylmethyl containing 3 to 9 carbon atoms, alkoxycarbonyl containing 2 to 7 carbon atoms, cyclohexyl, benzyl or phenyl; Y is cyano, nitroso, nitro, alkyl containing 1 to 6 carbon atoms, cyclohexyl, benzyl, phenyl, $-COOR_1$, $-COR_2$,

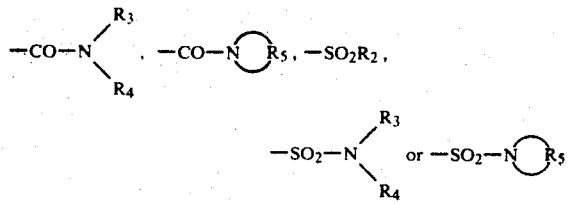

wherein $R_1$ is alkyl containing 1 to 6 carbon atoms; $R_2$ is alkyl containing 1 to 6 carbon atoms, cyclohexyl, benzyl, phenyl, methylphenyl, dimethylphenyl, methoxyphenyl or chlorophenyl; $R_3$ and $R_4$ are each hydrogen, alkyl or hydroxyalkyl containing 1 to 6 carbon atoms, alkoxyalkyl containing 2 to 7 carbon atoms, cyclohexyl, benzyl or phenyl and $R_5$ is $-CH_2-CH_2-O-CH_2-CH_2-$, $-(CH_2)_5-$ or $-CH_2-CH_2-NH-CH_2-CH_2-$ and Z is alkyl containing 1 to 6 carbon atoms, alkenyl containing 2 to 6 carbon atoms, mono- or dialkylaminoalkyl containing from 1 to 6 carbon atoms in each alkyl moiety, cyanoalkyl, hydroxyalkyl, ethanoyloxyalkyl, methoxyalkyl or phenoxyalkyl containing 1 to 6 carbon atoms in the alkyl moiety, cyclohexyl, benzyl, phenyl or substituted phenyl wherein the substituent is

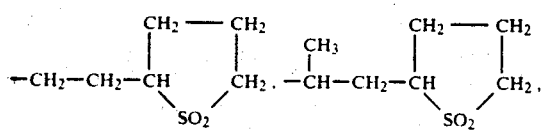

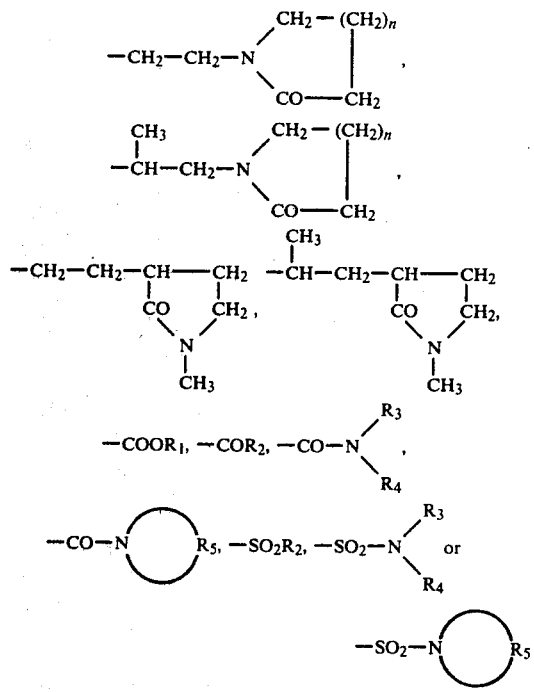

wherein n is an integer of from 0 to 3 and $R_1$, $R_2$, $R_3$, $R_4$ and $R_5$ are as aforesaid.

When X, Y or Z is cyclohexyl, benzyl or phenyl, it may be substituted by one or more halogen atoms, lower alkyl or lower alkoxy radicals.

Preferred R moieties include phenyl, monosubstituted phenyl whose substituent is selected from the group consisting of chlorine, nitro $-CO-CH_3$, $-CO$-phenyl, $-CH_2-SO_2-CH_3$, $-OSO_2CH_3$, $-OSO_2$-phenyl,

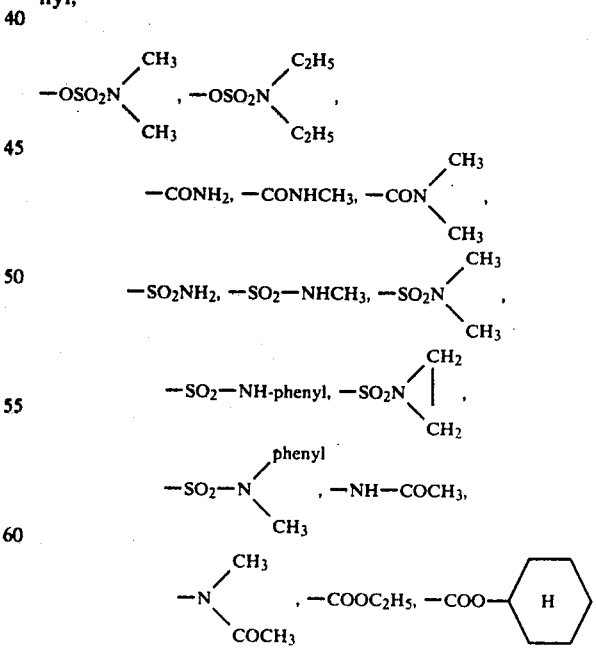

or disubstituted phenyl whose two substituents are selected from the group consisting of chlorine, bromine, nitro and cyano or trichlorophenyl.

Monoazo dyes of the present invention include those of the formula

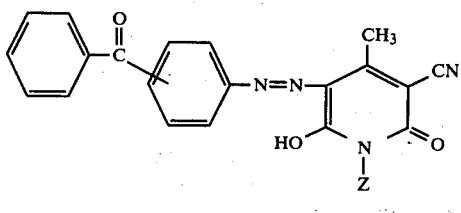

especially those of the formula

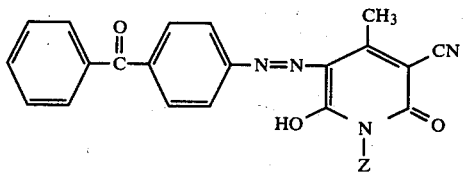

wherein, in each formula, Z is alkyl having 1 to 4 carbon atoms or methoxypropyl.

The dyestuffs of the present invention are obtained by coupling diazotized amines of the benzene, naphthalene, diphenyl, diphenylmethane or heterocyclic series which are free from water-solubilizing groups and have the general formula R.NH$_2$ with 6-hydroxy-2-pyridones of the general formula

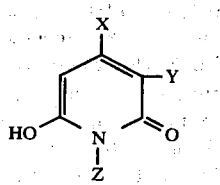

wherein X, Y and Z have the above-given meanings.

Diazo components of the general formula R.NH$_2$ are for example:
aniline,
2-, 3- or 4-amino-toluene,
3-amino-benzotrifluoride,
3- or 4-amino-1,2-dimethylbenzene,
2-, 4- or 5-amino-1,3-dimethylbenzene,
4-amino-1,3,5-trimethylbenzene,
2-,3- or 4-amino-anisole,
2-,3- or 4-amino-phenetole,
2-amino-1,4-dimethoxybenzene,
2-amino-1,4-diethoxybenzene,
2-, 3- or 4-amino-phenyl-β-hydroxy-ethyl ether,
2-, 3- or 4-amino-phenyl-β-hydroxy-n-propyl ether,
2-, 3- or 4-chloroaniline,
2-, 3- or 4-bromoaniline,
2,3-, 2,4-, 2,5- or 3,4-dichloroaniline,
2,5-dibromoaniline,
2,4,5-, 2,4,6-, 3,4,5- or 3,4,6-trichloroaniline,
3-, 4-, 5- or 6-chloro-2-amino-toluene,
4-chloro-3-amino-toluene,
2-chloro-4-amino-toluene,
5-chloro-2-amino-benzotrifluoride,
4,5- or 4,6-dichloro-2-amino-toluene,
2,5- or 4,6-dichloro-3-amino-toluene,
2,5- or 3,5-dichloro-4-amino-toluene,
4,5,6-trichloro-2-amino-toluene,
4-chloro-2-amino-1,3-dimethyl-benzene,
6-chloro-3-amino-anisole,
2-chloro-4-amino-anisole,
3-chloro-4-amino-anisole,
2-, 3- or 4-nitraniline,
3-nitro-4-amino-toluene,
5-nitro-4-amino-1,3-dimethylbenzene,
6-nitro-3-amino-anisole,
3-nitro-4-amino-anisole,
5-nitro-2-amino-phenetole,
2-nitro-4-amino-phenetole,
3-nitro-4-amino-phenetole,
5-nitro-2-amino-1,4-dimethoxy-benzene,
5-nitro-2-amino-1,4-diethoxy-benzene,
2-chloro-4-nitraniline,
2-bromo-4-nitraniline,
4-chloro-2-nitraniline,
4-bromo-2-nitraniline,
2,6-dichloro-4-nitraniline,
2,6-dibromo-4-nitraniline,
2,4-dinitraniline,
6-chloro-2,4-dinitraniline,
6-bromo-2,4-dinitraniline,
2,4,6-trinitraniline,
2-cyano-4-nitraniline,
4-cyano-3-nitraniline,
2-methylsulfonyl-4-nitraniline,
4-methylsulfonyl-2-nitraniline,
2-, 3- or 4-amino-acetophenone,
2-, 3- or 4-amino-benzophenone,
ethyl 2-, 3- or 4-amino-benzoate,
n-butyl 2-, 3- or 4-amino-benzoate,
cyclohexyl 2-, 3- or 4-amino-benzoate,
2-, 3- or 4-amino-benzamide,
2-, 3- or 4-amino-N-methyl-benzamide,
2-, 3- or 4-amino-N,N-dimethyl-benzamide,
N-(2-, 3- or 4-amino-benzoyl)ethylenimine,
2-, 3- or 4-amino-N-isopropyl-benzamide,
2-, 3- or 4-amino-N,N-diethyl-benzamide,
2-, 3- or 4-amino-N,N-di-n-butyl-benzamide,
2-, 3- or 4-amino-benzoic acid morpholide,
2-, 3- or 4-amino-benzanilide,
2-, 3- or 4-amino-N-methyl-benzanilide,
2-, 3- or 4-amino-phenyl methyl sulfone,
2-, 3- or 4-amino-benzyl methyl sulfone,
2-, 3- or 4-amino-phenethyl methyl sulfone,
3-(4'-amino-phenyl)-propyl methyl sulfone,
2-(4'-amino-phenyl)-propyl methyl sulfone,
1-(4'-amino-phenethyl)-tetramethylene-sulfone,
2-, 3- or 4-amino-phenyl γ-methylsulfonyl-propyl ether,
2-, 3- or 4-amino-phenyl methylsulfonate,
2-, 3- or 4-amino-phenyl ethylsulfonate,
2-, 3- or 4-amino-phenyl β-chloro-ethylsulfonate,
2-, 3- or 4-amino-phenyl butylsulfonate,
2-, 3- or 4-amino-phenyl n-hexylsulfonate,
2-, 3- or 4-amino-phenyl phenylsulfonate,
2-, 3- or 4-amino-phenyl 4'-methyl-phenylsulfonate,
2-, 3- or 4-amino-phenyl 4'-methoxy-phenylsulfonate,
2-, 3- or 4-amino-phenyl N,N-dimethylsulfamate,
2-, 3- or 4-amino-phenyl N,N-diethylsulfamate,
2-, 3- or 4-amino-phenyl N,N-di-n-butylsulfamate,
2-, 3- or 4-amino-benzene-sulfonamide,
2-, 3- or 4-amino-benzene-N-methyl-sulfonamide,
2-, 3- or 4-amino-benzene-N,N-dimethyl-sulfonamide,
2-, 3- or 4-amino-phenylsulfonyl-ethylenimine,
2-, 3- or 4-amino-benzene, N,N-diethyl-sulfonamide,
2-, 3- or 4-amino-benzene-N,N-di-n-butyl-sulfonamide,
2-, 3- or 4-amino-benzene sulfonic acid morpholide,
2-, 3- or 4-amino-benzene sulfonic acid anilide, 2-, 3- or 4-amino-benzene sulfonic acid N-methyl-anilide,
1-methoxy-2-amino-benzene-4-N,N-dimethyl-sulfonamide,
1-methoxy-2-amino-benzene-4-sulfonamide,
1-methoxy-2-amino-benzene-4-sulfonic acid N-methylanilide,
1-chloro-2-amino-benzene-4-N,N-dimethylsulfonamide,
1-chloro-4-amino-benzene-2-N,N-dimethylsulfonamide,
2-, 3- or 4-amino-acetanilide,
2-, 3- or 4-amino-N-(β-butoxy-propionyl)-aniline,
1,2-, 1,3- or 1,4-N-phenoxyacetyl-phenylene-diamine,
2-, 3- or 4-amino-N-methyl-acetanilide,
N-(4-amino-phenethyl)-γ-butyrolactam,
N-methyl-α-(4-amino-phenethyl)-γ-butyrolactam,
N-methyl-α-(4-amino-β-phenpropyl)-γ-butyrolactam,
N-(4-amino-phenethyl)-ε-caprolactam,
4-amino-diphenyl,
ethyl 4-amino-diphenyl-4'-carboxylate,
4-amino-diphenyl-methan,
4-amino-diphenyl-dimethyl-methan,
1-amino-naphthaline,
8-chloro-1-amino-naphthaline,
5-nitro-1-amino-naphthaline,
2-amino-naphthaline,
5-nitro-2-amino-thiazole, Suitable coupling components in the meaning of the above formula are, for instance, the derivatives of the following 6-hydroxy-pyridones that are substituted in the 3-position by cyano:
1-methyl-6-hydroxy-2-pyridone,
1-phenyl-6-hydroxy-2-pyridone,
1-methyl-4-methyl-6-hydroxy-2-pyridone,
1-ethyl-4-methyl-6-hydroxy-2-pyridone,
1-n- or iso-propyl-4-methyl-6-hydroxy-2-pyridone,
1-n- iso- or sec.-butyl-4-methyl-6-hydroxy-2-pyridone,
1-n- or iso-amyl-4-methyl-6-hydroxy-2-pyridone,
1-n-hexyl-4-methyl-6-hydroxy-2-pyridone,
1-(2'-dimethylamino- or diethylamino-ethyl)-4-methyl-6-hydroxy-2-pyridon,
1-(2'-cyano-ethyl)-4-methyl-6-hydroxy-2-pyridone,
1-(2'-hydroxy-ethyl)-4-methyl-6-hydroxy-2-pyridone,
1-(2'-acetoxy-ethyl)-4-methyl-6-hydroxy-2-pyridone,
1-(2'-phenoxy-acetoxy-ethyl)-4-methyl-6-hydroxy-2-pyridone,
1-(1'-methyl-2'-hydroxy-ethyl)-4-methyl-6-hydroxy-2-pyridone,
1-(3'-hydroxy-propyl)-4-methyl-6-hydroxy-2-pyridone,
1-(2'-phenoxy-ethyl)-4-methyl-6-hydroxy-2-pyridone,
1-(3'-methoxy-propyl)-4-methyl-6-hydroxy-2-pyridone,
1-cyclohexyl-4-methyl-6-hydroxy-2-pyridone,
1-benzyl-4-methyl-6-hydroxy-2-pyridone,
1-(3'-methyl-benzyl)-4-methyl-6-hydroxy-2-pyridone,
1-phenyl-4-methyl-6-hydroxy-2-pyridone,
1-(2'- or 4'-methyl-phenyl)-4-methyl-6-hydroxy-2-pyridone,
1-(2',4'-dimethyl-phenyl)-4-methyl-6-hydroxy-2-pyridone,
1-(2'-chloro-4'-methylphenyl)-4-methyl-6-hydroxy-2-pyridone,
1-(2'- or 4'-chlorophenyl)-4-methyl-6-hydroxy-2-pyridone,
1-(2'- or 4'-methoxy-phenyl)-4-methyl-6-hydroxy-2-pyridone,
1-(2',5'-dimethyl-4'-chloro-phenyl)-4-methyl-6-hydroxy-2-pyridone,
1-[4'-(3''-methyl-sulfonyl-propyl)-phenyl]-4-methyl-6-hydroxy-2-pyridone of the formula

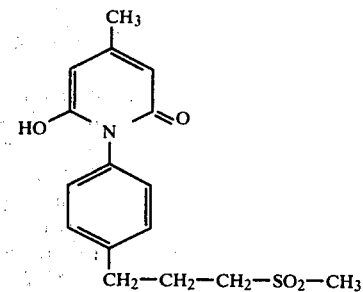

1-[4'-(2''-N-ε-caprolactam)-ethyl]-phenyl-4-methyl-6-hydroxy-2-pyridone of the formula

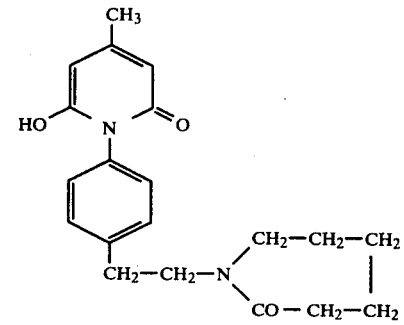

1-{4'-[2''-(α-N-methyl-γ-butyrolactam)-ethyl]-phenyl}-4-methyl-6-hydroxy-2-pyridone of the formula

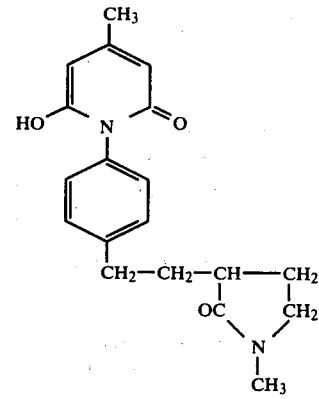

1-(2'-, 3'- or 4'-ethoxycarbonyl-phenyl)-4-methyl-6-hydroxy-2-pyridone,
1-(2'-, 3'- or 4'-acetyl-phenyl)-4-methyl-6-hydroxy-2-pyridone,
1-(2'-, 3'- or 4'-benzoyl-phenyl)-4-methyl-6-hydroxy-2-pyridone,
1-(2'-, 3'- or 4'-dimethyl-carbamoyl-phenyl)-4-methyl-6-hydroxy-2-pyridone,
1-(2'-, 3'- or 4'-diethyl-carbamoyl-phenyl)-4-methyl-6-hydroxy-2-pyridone,
1-(2'-, 3'- or 4'-iso-propyl-carbamoyl-phenyl)-4-methyl-6-hydroxy-2-pyridone,
1-(2'-, 3'- or 4'-methylsulfonyl-phenyl)-4-methyl-6-hydroxy-2-pyridone,
1-(2'-, 3'- or 4'-phenylsulfonyl-phenyl)-4-methyl-6-hydroxy-2-pyridone,
1-(2'-, 3'- or 4'-dimethylsulfamoyl-phenyl)-4-methyl-6-hydroxy-2-pyridone, 1-(2'-, 3'- or 4'-iso-propylsulfamoyl-phenyl)-4-methyl-6-hydroxy-2-pyridone,
1-(2'-, 3'- or 4'-diethylsulfamoyl-phenyl)-4-methyl-6-hydroxy-2-pyridone.

Further suitable coupling components are those 3-cyano-6-hydroxy-pyridones containing in the 4-position instead of the methyl group an ethyl, n- or isopropyl, n-, iso- or sec.butyl, n- or isoamyl, n-hexyl, cyclohexyl, benzyl, phenyl, 4'-methyl-phenyl, or an ethoxycarbonyl group or the residue —$CH_2$—$COOCH_3$. Likewise suited are the derivatives of these pyridones wherein the cyano group in the 3-position is replaced by a nitroso, nitro, methyl, ethyl n- or isopropyl, n-, iso- or sec.butyl, n- or isoamyl, n-hexyl, cyclohexyl, benzyl or phenyl, group or by one of the following residues:
3-methyl carboxylate,
3-ethyl carboxylate,
3-n- or iso-propyl carboxylate,
3-n-, iso- or sec.-butyl carboxylate,
3-n- or iso-amyl carboxylate,
3-n-hexyl carboxylate,
3-acetyl,
3-propionyl,
3-capronyl,
3-capryl,
3-hexahydrobenzoyl,
3-phenacetyl,
3-benzoyl,
3-(4'-methyl-benzoyl),
3-(2',4'-dimethyl-benzoyl),
3-(4'-methoxy-benzoyl),
3-(4'-chloro-benzoyl),
3-carbonamide,
3-N-methyl-carbonamide,
3-N,N-dimethyl-carbonamide,
3-N-carbonyl ethylenimine,
3-N-ethyl-carbonamide,
3-N-isopropyl-carbonamide,
3-N,N-diethyl-carbonamide,
3-N-hydroxyethyl-carbonamide,
3-N-γ-methoxypropyl-carbonamide,
3-carboxylic acid morpholide,
3-carboxylic acid piperidide,
3-N-cyclohexyl carbonamide,
3-N-benzyl-carbonamide,
3-carboxylic acid anilide,
3-carboxylic acid-(4'-methyl-anilide),
3-carboxylic acid (N-methyl-anilide),
3-methylsulfonyl,
3-ethylsulfonyl,
3-n- or iso-propylsulfonyl,
3-n-, iso- or sec.-butylsulfonyl,
3-n- or iso-amylsulfonyl,
3-n-hexylsulfonyl,
3-benzylsulfonyl,
3-phenylsulfonyl,
3-(4'-methyl-phenyl)-sulfonyl,
3-(2',4'-dimethyl-phenyl)-sulfonyl,
3-(4'-methoxy-phenyl)-sulfonyl,
3-(4'-chloro-phenyl)-sulfonyl,
3-sulfonamide,
3-N-methylsulfonamide,
3-N,N-dimethylsulfonamide,
3-N-sulfonyl-ethylenimine,
3-N-ethylsulfonamide,
3-N-isopropylsulfonamide,
3-N,N-diethylsulfonamide,
3-N-hydroxyethylsulfonamide,
3-N-γ-methoxypropylsulfonamide,
3-sulfonic acid morpholide,
3-sulfonic acid piperidide,
3-N-cyclohexylsulfonamide,
3-N-benzylsulfonamide,
3-sulfonic acid anilide,
3-sulfonic acid (4'-methyl-anilide),
3-sulfonic acid (N-methyl-anilide).

Particularly valuable dyestuffs are those the diazo component of which derive from 3-amino-phenyl phenylsulfonate, 3-amino-phenyl p-tolylsulfonate, 3-amino-phenyl p-anisylsulfonate and 4-amino-benzophenone in combination with a 1-($C_1$–$C_4$)-alkyl or 1-methoxypropyl-3-cyano-4-methyl-6-hydroxy-2-pyridone as coupling component.

The dyestuffs of the present invention are excellently suited for the dyeing and printing of fabrics made from synthetic materials, such as polyacrylonitrile, polyamide, cellulose 2½ acetate, cellulose triacetate and particularly polyester materials such as those on the basis of polyethylene glycolterephthalate. When applied according to the usual dyeing and printing methods onto these materials they yield deep dyeings and full prints showing yellow to red shades and having very good fastness properties, in particular an excellent fastness to light and sublimation.

Dyes of the above described kind and having in the 3-position a cyano group yield dyeings and prints of particularly good dyeing properties.

The dyes of the present invention possess a great coloring strength and a very good build-up capacity. Compared to dyes of similar constitution, they have a lower solubility in aqueous dye liquors. This is of advantage, for example when dyeing is performed in those dyeing apparatuses in which the equal temperatures cannot be maintained throughout, which ultimately, results in undesirable crystallisations or dye deposits in the dyeing equipment or on the goods to be dyed. Thanks to the low solubility of the dyes of the invention such undesirable dye deposits are avoided. Additionally, the dyestuffs of the present invention possess a very good affinity for hydrophobic synthetic fibers, which, when dyeing is effected according to the exhaust dyeing, leads to a high exhaustion of the bath.

A further advantage of the dyestuffs of the present invention consists in that they stain hydrophilic fibers, such as, for instance wool or cotton, to a low degree and, therefore, are especially suited for the dyeing of blended fabrics, for example polyester/wood or polyester/cotton-mixed fabrics. In addition to the outstanding fastnesses to light and sublimation the dyes of the present invention exhibit good fastness properties, in particular a good fastness to mechanical washing at 95° C., to peroxide washing, perspiration in acid, particularly alkaline medium, nitric oxide/gas fume fading, bleaching with hypochlorite severe, rubbing, permanent press (Koratron).

Furthermore the dyes of the present invention are insensitive to any change of the pH value of the dyebath. A good pH-resistance is of special advantage in the dyeing of mixed materials, such as polyester and cellulose-based mixed fabrics.

Dyeing of said materials with the dyes of the present invention is advantageously performed from an aqueous suspension in the presence of carriers at temperatures of between about 80° and 110° C. in the absence of carriers between about 110° C. and 140° C. and also according to the so-called thermofixing process at about 170° C. to 230° C. Printing can be carried out in such a manner that the materials, after being printed, are steamed in the presence of a carrier at about 80° C. to 110° C. or in the absence of a carrier at about 110° C. to 140° C. or alternatively are treated according to the so-called thermo-fixing process at about 170° C. to 230° C.

Typical preparations are described in the following Examples where all temperatures are in degrees Centigrade and all parts are parts by weight.

EXAMPLE 1

21.6 parts 3-amino-phenyl N,N-dimethylsulfamate are dissolved in 300 parts of water with the addition of 36 parts of a 30% hydrochloric acid and diazotized at 0° to +5° with a solution consisting of 7.7 parts sodium nitrite dissolved in 50 parts of water. The diazo solution is allowed to run into a solution consisting of 18.0 parts 1-methyl-3-cyano-4-methyl-6-hydroxy-2-pyridone dissolved in 400 parts of water, 18.2 parts of sodium hydroxide solution (33° Bé) and 36.0 parts of sodium acetate; during the coupling process the reaction temperature is kept at 0° to +5° by the addition of 500 parts of ice. The coupling process being terminated, the dyestuff so formed is sucked off, washed with water until neutral and finally dried. The dyestuff constitutes a yellow powder dissolving in concentrated sulfuric acid with a reddish yellow color. It has a melting point of 196° to 197°.

The 1-methyl-3-cyano-4-methyl-6-hydroxy-2-pyridone required as intermediate may be prepared, for instance, by condensation of methyl acetoacetate with N-methyl-cyanoacetamide in an aqueous alkaline medium at room temperature. It constitutes a colorless powder melting at 280° to 282°.

1.0 parts of the finely dispersed dyestuff obtained according to the above prescription and having the formula

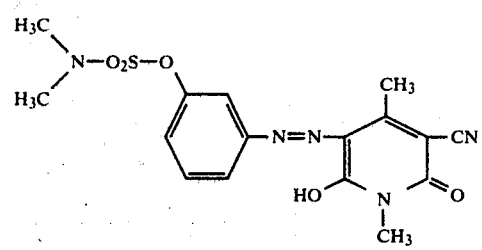

are stirred into 2000 parts of water. The reaction mixture is adjusted with acetic acid to a pH-value of 5 to 6 and admixed with 4 g. ammonium sulfate and 2 g. of a commercial dispersing agent on the basis of a naphthalene sulfonic acid formaldehyde condensate. 100 parts by weight of a polyester fabric on the basis of polyethylene glycolterephthalate are introduced into the thus obtained dye bath and dyed during 1½ hours at 120° to 130°. After subsequent rinsing, reductive aftertreatment with a 0.2% alkaline sodium dithionite solution during 15 minutes at 60° to 70° rinsing and drying, there is obtained a greenish yellow dyeing having very good fastness properties, especially a very good fastness to light.

The following table enumerates further dyestuffs of the present invention that are prepared according to the above prescription. The ultimate column indicates the shades obtained with the respective dyestuffs when dyed or printed on polyester fibers. All the enumerated dyestuffs have very good fastness properties.

TABLE 1

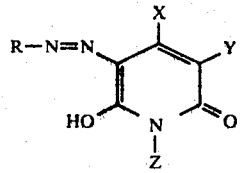

| No. | R | X | Y | Z | Shade on Polyester |
|---|---|---|---|---|---|
| 1. | 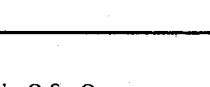 H₃C\N—O₂S—O—⌬— / H₃C | —H | —CN | —⌬ | yellow |
| 2. | O₂N—⌬— | —CH₃ | —CN | —CH₃ | " |
| 3. | O₂N—⌬(Br)— | —CH₃ | —CN | —CH₃ | " |
| 4. | O₂N—⌬(CN)— | —CH₃ | —CN | —CH₃ | " |
| 5. | H₃C—O₂S—O—⌬— | —CH₃ | —CN | —CH₃ | " |
| 6. | ⌬—O₂S—O—⌬— | —CH₃ | —CN | —CH₃ | " |

TABLE 1-continued

Structure: R—N=N— [pyridone ring with X, Y, HO, =O, N-Z substituents]

| No. | R | X | Y | Z | Shade on Polyester |
|---|---|---|---|---|---|
| 7. | H₃C—H₂C\N—O₂S—O—⌬— / H₃C—H₂C | —CH₃ | —CN | —CH₃ | " |
| 8. | H₃C\N—O₂S—O—⌬— / H₃C | —CH₃ | —CN | —CH₃ | " |
| 9. | H₃C—O₂S—H₂C—⌬— | —CH₃ | —CN | —CH₃ | " |
| 10. | H₃C—O₂S—H₂C—H₂C—H₂C—⌬— | —CH₃ | —CN | —CH₃ | " |
| 11. | H₅C₂OOC—⌬— | —CH₃ | —CN | —CH₃ | " |
| 12. | (H)—OOC—⌬— | —CH₃ | —CN | —CH₃ | " |
| 13. | H₃C—OC—⌬— | —CH₃ | —CN | —CH₃ | " |
| 14. | ⌬—OC—⌬— | —CH₃ | —CN | —CH₃ | " |
| 15. | ⌬—O₂S—⌬— | —CH₃ | —CN | —CH₃ | " |
| 16. | [piperidine-N—H₂C—H₂C—⌬—] | —CH₃ | —CN | —CH₃ | " |
| 17. | [N-methylpyrrolidinone—H₂C—H₂C—⌬—] | —CH₃ | —CN | —CH₃ | " |
| 18. | H₃C—OC—HN—⌬(m)— | —CH₃ | —CN | —CH₃ | " |
| 19. | H₃C—OC—HN—⌬— | —CH₃ | —CN | —CH₃ | orange |
| 20. | H₃C—OC—N(CH₃)—⌬ (with phenyl on N) | —CH₃ | —CN | —CH₃ | yellow |
| 21. | naphthyl | —CH₃ | —CN | —CH₃ | orange |
| 22. | ⌬—C(CH₃)(CH₃)—⌬— | —CH₃ | —CN | —CH₃ | yellow |
| 23. | O₂N—[thiazole]— | —CH₃ | —CN | —CH₃ | red |

TABLE 1-continued $$R-N=N- \text{(pyridone structure with X, Y, Z, OH, N-Z, =O)}$$

| No. | R | X | Y | Z | Shade on Polyester |
|---|---|---|---|---|---|
| 24. | H₅C₂OOC—C₆H₄— | —CH₃ | —CN | —CH₂—CH₂—CH₂—CH₃ | yellow |
| 25. | (H₃C)₂N—O₂S—O—C₆H₄— (meta) | —CH₃ | —CN | " | " |
| 26. | (H₃C)₂N—O₂S—O—C₆H₄— (para) | —CH₃ | —CN | " | " |
| 27. | C₆H₅—O—C(=O)—C₆H₄— | —CH₃ | —CN | " | " |
| 28. | (H₃C)₂N—O₂S—O—C₆H₄— (meta) | —CH₃ | —CN | —CH₂—(CH₂)₄—CH₃ | " |
| 29. | C₆H₅— | —CH₃ | —CN | —CH₂—CH₂—OH | " |
| 30. | H₅C₂OOC—C₆H₄— | —CH₃ | —CN | " | " |
| 31. | 2-NO₂—C₆H₄— | —CH₃ | —CN | " | " |
| 32. | 4-O₂N—C₆H₄— | —CH₃ | —CN | —CH₂—CH₂—OH | yellow |
| 33. | 4-O₂N-2-Cl—C₆H₃— | —CH₃ | —CN | " | " |
| 34. | 4-O₂N-2-Br—C₆H₃— | —CH₃ | —CN | " | " |
| 35. | 4-Cl—C₆H₄— | —CH₃ | —CN | " | " |
| 36. | 2,4-Cl₂—C₆H₃— | —CH₃ | —CN | " | " |
| 37. | 2,4,5-Cl₃—C₆H₂— | —CH₃ | —CN | " | " |
| 38. | H₅C₂OOC—C₆H₄— | —CH₃ | —CN | —CH₂—CH₂—CH₂—OCH₃ | " |
| 39. | C₆H₅—O—C(=O)—C₆H₄— | —CH₃ | —CN | " | " |
| 40. | (H₃C)₂N—O₂S—O—C₆H₄— (meta) | —CH₃ | —CN | " | " |

TABLE 1-continued $$R-N=N-\underset{\underset{Z}{N}}{\overset{HO}{\bigg|}}\overset{X}{\underset{}{\bigcirc}}\overset{Y}{\underset{}{=O}}$$

| No. | R | X | Y | Z | Shade on Polyester |
|---|---|---|---|---|---|
| 41. | (H₃C)₂N−SO₂−O−C₆H₄− (para) | −CH₃ | −CN | " | " |
| 42. | (H₃C)₂N−SO₂−O−C₆H₄− (meta) | −CH₃ | −CN | −CH₂−CH₂−CH₂−O−C₆H₅ | yellow |
| 43. | (H₃C)₂N−SO₂−O−C₆H₄− (para) | −CH₃ | −CN | −CH₂−CH₂−O−CO−CH₃ | yellow |
| 44. | H₃C−O₂S−O−C₆H₄− | −CH₃ | −CN | −CH₂−CH₂−O−CO−CH₂−O−C₆H₅ | yellow |
| 45. | (H₃C)₂N−SO₂−O−C₆H₄− (meta) | −CH₃ | −CN | −CH₂−CH₂−O−CO−NH−(CH₂)₃−CH₃ | yellow |
| 46. | H₃C−O₂S−O−C₆H₄− | −CH₃ | −CN | −CH₂−CH₂−O−CO−NH−C₆H₅ | " |
| 47. | (H₃C)₂N−SO₂−O−C₆H₄− (meta) | −CH₃ | −CN | −CH₂−CH₂−N(CH₃)₂ | " |
| 48. | H₅C₂OOC−C₆H₄− | −CH₃ | −CN | −CH₂−C₆H₅ | " |
| 49. | O₂N−C₆H₄− | −CH₃ | −CN | −CH₂−C₆H₅ | " |
| 50. | 2-Cl-4-O₂N−C₆H₃− | −CH₃ | −CN | −CH₂−C₆H₅ | " |
| 51. | (H₃C)₂N−SO₂−O−C₆H₄− (meta) | −CH₃ | −CN | −CH₂−C₆H₅ | " |
| 52. | H₃C−O₂S−O−C₆H₄− | −CH₃ | −CN | −CH₂−C₆H₄−CH₃ | " |
| 53. | Cl−C₆H₄− | −CH₃ | −CN | −C₆H₅ | yellow |
| 54. | 2,4-Cl₂−C₆H₃− | −CH₃ | −CN | −C₆H₅ | " |
| 55. | O₂N−C₆H₄− | −CH₃ | −CN | −C₆H₅ | " |
| 56. | 2-Cl-4-O₂N−C₆H₃− | −CH₃ | −CN | −C₆H₅ | " |

TABLE 1-continued

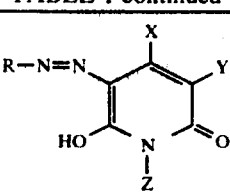

| No. | R | X | Y | Z | Shade on Polyester |
|---|---|---|---|---|---|
| 57. |  | —CH$_3$ | —CN |  | " |
| 58. |  | —CH$_3$ | —CN | 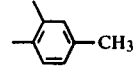 | " |
| 59. |  | —CH$_3$ | —CN |  | " |
| 60. | 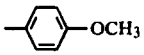 | —CH$_3$ | —CN | 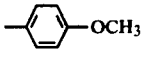 | " |
| 61. | 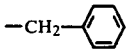 | —CH$_3$ | —CN |  | " |
| 62. |  | —CH$_3$ | —CN | (CH$_3$, CH$_3$ dimethylphenyl) | " |
| 63. | (phenoxybenzoyl) | —CH$_3$ | —CN | (—C$_6$H$_4$—OCH$_3$) | " |
| 64. | ((CH$_3$)$_2$N—O$_2$S—O—C$_6$H$_4$—) | —CH$_3$ | —CN | (—C$_6$H$_4$—OCH$_3$) | " |
| 65. | (phenoxybenzoyl) | —CH$_2$—CH$_3$ | —CN | —CH$_3$ | " |
| 66. | ((CH$_3$)$_2$N—O$_2$S—O—C$_6$H$_4$—) | —CH$_2$—CH$_3$ | —CN | —CH$_2$—CH$_2$—CH$_2$—OCH$_3$ | yellow |
| 67. | (H$_5$C$_2$OOC—C$_6$H$_4$—) | —CH$_2$—CH$_3$ | —CN | —CH$_2$—C$_6$H$_5$ | " |
| 68. | (phenoxybenzoyl) | —CH$_2$—CH$_3$ | —CN | (phenyl) | " |
| 69. | (H$_5$C$_2$OOC—C$_6$H$_4$—) | —CH$_2$—COOCH$_3$ | —CN | —CH$_3$ | " |
| 70. | ((CH$_3$)$_2$N—O$_2$S—O—C$_6$H$_4$—) | " | —CN | —CH$_2$—CH$_2$—OH | " |
| 71. | ((CH$_3$)$_2$N—O$_2$S—O—C$_6$H$_4$—) | " | —CN | —CH$_2$—CH$_2$—CH$_2$—OCH$_3$ | " |
| 72. | (H$_3$C—O$_2$S—O—C$_6$H$_4$—) | (phenyl) | —CN | —CH$_3$ | " |

TABLE 1-continued

R—N=N—[pyridone with X, Y, HO, N-Z, =O substituents]

| No. | R | X | Y | Z | Shade on Polyester |
|---|---|---|---|---|---|
| 73. | (H3C)2N—O2S—O—C6H4— | —CN | —C6H5 | —CH2—CH2—CH2—OCH3 | " |

EXAMPLE 2

16.5 parts ethyl 4-amino-benzoate are dissolved in 300 parts of water with the addition of 36 parts of a 30% hydrochloric acid, diazotized according to the prescription given in para 1 of Example 1, coupled with 24.9 parts of 1-phenyl-3-cyano-4-methyl-6-hydroxy-2-pyridone and the dyestuff being formed is isolated. The dyestuff constitutes a yellow powder that dissolves in concentrated sulfuric acid with a reddish yellow color. It melts with decomposition at 269°.

The 1-phenyl-3-cyano-4-methyl-6-hydroxy-2-pyridone required as intermediate is obtained by condensation of acetoacetanilide with methyl cyano acetate or of methyl aceto acetate with cyanoacetanilide in ethanol with the addition of potassium hydroxide at 85°. This pyridone derivative constitutes a colorless substance melting with decomposition at 313° to 315°.

A fabric made from polyethylene glycolterephthalate is padded at 30° on the padding machine with a liquor containing 20.0 parts of the finely dispersed dyestuff of the formula

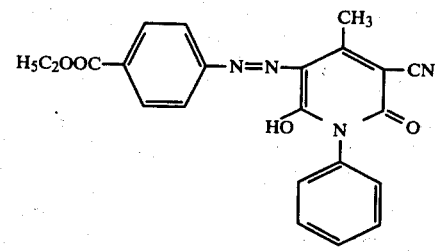

which is prepared as described above, 1.0 parts polyacrylamide having a k-value of 120 and 0.5 parts of a polyglycol ether of the oleyl alcohol and 978.5 parts of water. After drying, the dyeing is fixed during 60 seconds at 210° on the thermofixing frame. After subsequent rinsing and working up as described in para 3 of Example 1, there is obtained a greenish yellow dyeing having excellent fastness properties.

The following table enumerates further dyestuffs of the present invention that are prepared according to the above description. Their dyeings and prints on polyester materials show very good fastness properties.

TABLE 2

R—N=N—[pyridone with X, Y, HO, N-Z, =O substituents]

| No. | R | X | Y | Z | Shade on Polyester |
|---|---|---|---|---|---|
| 1. | C6H5—O2S—O—C6H4— | —CH3 | —COOC2H5 | —CH3 | yellow |
| 2. | (H3C)2N—O2S—O—C6H4— | —CH3 | —COO(CH2)5—CH3 | —CH3 | " |
| 3. | H3C—OC—C6H4— | —CH3 | —CO—CH3 | —CH3 | " |
| 4. | H3C—O2S—O—C6H4— | —CH3 | —CO—C6H5 | —CH3 | " |
| 5. | 4-Cl-2-NO2-C6H3— | —CH3 | —CO—NH2 | —CH3 | " |

TABLE 2-continued

Structure:
R—N=N— attached to a pyridine-dione ring with substituents X (top), Y (right), OH, and N—Z, with =O groups.

| No. | R | X | Y | Z | Shade on Polyester |
|---|---|---|---|---|---|
| 6. | H₃C—OC—⟨C₆H₄⟩— | —CH₃ | —CO—N(CH₃)₂ | —CH₃ | " |
| 7. | 2-Cl—C₆H₄— | —CH₃ | —CO—N(CH₂CH₂)₂O (morpholino) | —CH₃ | " |
| 8. | H₅C₂OOC—⟨C₆H₄⟩— | —CH₃ | —SO₂—C₆H₅ | —CH₃ | " |
| 9. | 2-NO₂—C₆H₄— | —CH₃ | —SO₂—NH₂ | —CH₃ | " |
| 10. | 2-Cl—C₆H₄— | —CH₃ | —SO₂—N(CH₃)₂ | —CH₃ | " |
| 11. | (H₃C)₂N—O₂S—O—⟨C₆H₄⟩— | —CH₃ | —COOC₂H₅ | —(CH₂)₃—CH₃ | " |
| 12. | 4-Cl-2-NO₂—C₆H₃— | —CH₃ | —CO—NH₂ | —(CH₂)₅—CH₃ | " |
| 13. | C₆H₅—O—C(...)—⟨C₆H₄⟩— | —CH₃ | —COO(CH₂)₃—CH₃ | —CH₂—CH₂—CH₂—O—CH₃ | " |
| 14. | C₆H₅—O₂S—O—⟨C₆H₄⟩— | —CH₃ | —CO—CH₃ | " | " |
| 15. | 2-NO₂—C₆H₄— | —CH₃ | —CO—NH₂ | " | " |
| 16. | 2-Cl—C₆H₄— | —CH₃ | —SO₂—CH₃ | —CH₂—CH₂—CH₂—O—CH₃ | " |
| 17. | 4-Cl—C₆H₄— | —CH₃ | —CO—NH₂ | —CH₂—C₆H₅ | " |
| 18. | H₃C—OC—⟨C₆H₄⟩— | —CH₃ | —COOC₂H₅ | —C₆H₅ | " |
| 19. | 2-Cl—C₆H₄— | —CH₃ | —CO—NH₂ | —C₆H₅ | " |
| 20. | H₅C₂OOC—⟨C₆H₄⟩— | —CH₃ | " | —C₆H₄—OCH₃ | " |
| 21. | H₃C—OC—⟨C₆H₄⟩— | —CH₂—CH₃ | " | —CH₃ | " |
| 22. | C₆H₅—O₂S—O—⟨C₆H₄⟩— | " | —COOC₂H₅ | —CH₂—CH₂—CH₂—O—CH₃ | " |
| 23. | 2-Cl—C₆H₄— | —C₆H₅ | —CO—NH₂ | —CH₃ | " |

TABLE 2-continued

R—N=N—[pyridone with X, Y, HO, Z, =O]

| No. | R | X | Y | Z | Shade on Polyester |
|---|---|---|---|---|---|
| 24. | H₃C—O₂S—O—⟨phenyl⟩— | " | —CO—CH₃ | —CH₂—CH₂—CH₂—O—CH₃ | " |

EXAMPLE 3

21.6 parts 4-amino-phenyl N,N-dimethylsulfamate are diazotized as described in para 1 of Example 1, coupled with 24.4 parts 1-(3′-methoxy-propyl)-3-cyano-4-methyl-6-hydroxy-2-pyridone and the dyestuff being formed is isolated. The dyestuff constitutes a yellow powder that dissolves in concentrated sulfuric acid with a reddish yellow color. It has a melting point of 178° to 182°.

The 1-(3′-methoxy-propyl)-3-cyano-4-methyl-6-hydroxy-2-pyridone required as intermediate for the preparation of the above dyestuff is obtained for instance by condensation of methyl aceto-acetate with cyano-acetic acid-(3′-methoxy-propylamide) in ethanol with the addition of potassium hydroxide at 85°. It constitutes a colorless powder melting at 198° to 199°.

30 parts of the dyestuff (calculated on 1000 g. of a printing paste) of the formula

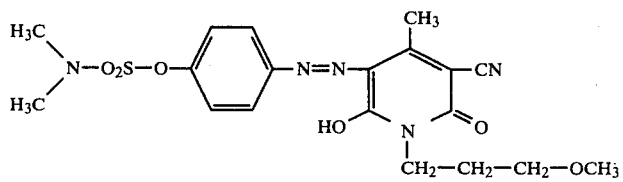

the preparation of which is described above, are incorporated in a finely divided form into a printing paste containing 45.0 parts locust bean meal, 6.0 parts sodium 3-nitro-benzenesulfonate and 3.0 parts citric acid. This printing paste, when applied onto a polyester fabric yields after printing, drying and fixing on the thermofixing frame during 45 seconds at 215°, subsequent rinsing and working up as described in para 3 of Example 1 greenish yellow prints having very good fastness properties.

The dyestuff yields in the printing of triacetate fabrics, if employed in the form of the above described printing paste, and the printed fabric is steamed, after drying, for 10 minutes at a superatmospheric pressure of 1.5 atmospheres, subsequently rinsed, soaped, rinsed again and dried, a greenish yellow print having a very good fastness to light.

The following table enumerates further dyestuffs of the present invention as well as their shades when applied onto polyester materials.

TABLE 3

R—N=N—[pyridone with X, Y, HO, Z, =O]

| No. | R | X | Y | Z | Shade on Polyester |
|---|---|---|---|---|---|
| 1. | (H₃C)₂N—O₂S—O—⟨phenyl⟩— | —CH₃ | —CH₂—CH₃ | —CH₃ | yellow |
| 2. | ⟨phenyl⟩—OC—⟨phenyl⟩— | —CH₃ | —(CH₂)₅—CH₃ | —CH₃ | " |
| 3. | H₃C—O₂S—O—⟨tolyl⟩— | —CH₃ | —CH₂—⟨phenyl⟩ | —CH₃ | " |
| 4. | H₅C₂OOC—⟨phenyl⟩— | —CH₃ | —⟨phenyl⟩ | —CH₃ | " |

TABLE 3-continued

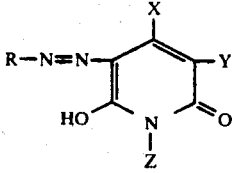

| No. | R | X | Y | Z | Shade on Polyester |
|---|---|---|---|---|---|
| 5. |  (2-nitrophenyl, with methyl) | —CH$_3$ | —CH$_2$—CH$_2$—CH$_2$—CH$_3$ | —CH$_2$—CH$_2$—OH | " |
| 6. | 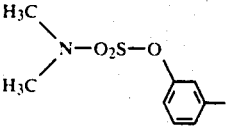 ((CH$_3$)$_2$N—O$_2$S—O—phenyl) | —CH$_3$ | " | —CH$_2$—CH$_2$—CH$_2$—O—CH$_3$ | " |
| 7. | H$_2$C—O$_2$S—H$_2$C—H$_2$C—H$_2$C— 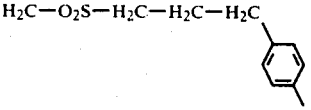 | —CH$_3$ | —CH$_2$—CH$_3$ | —CH$_2$—CH$_2$—CH$_2$—CH$_2$—CH$_2$—CH$_3$ | " |
| 8. | 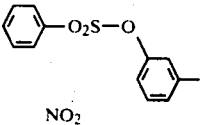 (phenyl-O$_2$S—O-phenyl) | —CH$_3$ | —CH(CH$_3$)$_2$ | —CH$_2$—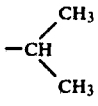 | " |
| 9. |  (2-nitrophenyl) | —CH$_3$ | —CH$_2$—CH$_3$ |  (phenyl) | " |
| 10. | H$_3$C—O$_2$S—O— | 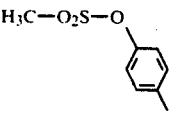 (phenyl) | —CH$_2$—CH$_3$ | —CH$_2$—CH$_2$—CH$_2$—O—CH$_3$ | yellow |
| 11. |  ((CH$_3$)$_2$N—O$_2$S—O-phenyl) | 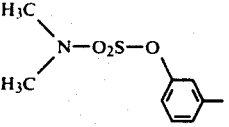 (phenyl) | —CH$_2$—CH$_2$—CH$_2$—CH$_3$ | —CH$_3$ | " |
| 12. |  (2-nitrophenyl) | —CH$_3$ | —NO$_2$ | —CH$_3$ | " |
| 13. |  (H$_3$C-, NO$_2$-phenyl) | —CH$_3$ | —NO$_2$ | —CH$_2$—CH$_2$—CH$_2$—OCH$_3$ | " |
| 14. | 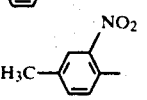 ((CH$_3$)$_2$N—O$_2$S—O-phenyl) | —CH$_3$ | —NO$_2$ | —CH$_2$—CH$_2$—CH$_2$—CH$_3$ | " |
| 15. | 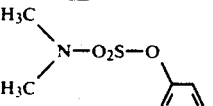 (phenyl—OC—phenyl) | —CH$_2$—CH$_3$ | —NO$_2$ | —CH$_3$ | " |
| 16. | 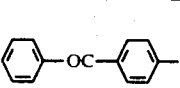 (2-nitrophenyl) | —CH$_3$ | —NO | —CH$_3$ | " |
| 17. | H$_5$C$_2$OOC— | —CH$_3$ | —NO | —CH$_2$—CH$_2$—CH$_2$—CH$_3$ | " |

EXAMPLE 4

26.2 parts 3-amino-benzene-sulfonic acid N-methyl-anilide are diazotized and coupled as described in para 1 of Example 1. The isolated dyestuff constitutes a yellow powder that dissolves in concentrated sulfuric acid with a greenish yellow color. It has a melting point of 253° to 255°.

30 parts of the above described dyestuff (calculated on 1000 g. of a printing paste) of the formula

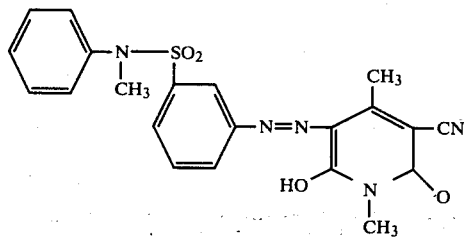

are incorporated in a finely dispersed form into a printing paste containing 16.0 parts of an alginate thickener and 20.0 parts of a starch ether. This printing paste, when applied onto a polyester fabric yields, after printing, drying and fixing on the thermofixing frame during 60 seconds at 220°, subsequent rinsing and working up as described in para 3 of Example 1, a greenish yellow print having very good fastness properties.

The following table enumerates further dyestuffs of the present invention as well as their shades when applied onto polyester material.

TABLE 4

| No. | R | X | Y | Z | Shade on Polyester |
|---|---|---|---|---|---|
| 1. | H₃C–N(–O₂S–⌬–)(–⌬) | —H | —CN | –⌬ | yellow |
| 2. | H₂N—CO–⌬– | —CH₃ | —CN | —CH₃ | " |
| 3. | H₂N—OC–⌬– | —CH₃ | —CN | —CH₃ | " |
| 4. | H₂N—OC–⌬– | —CH₃ | —CN | —CH₃ | " |
| 5. | H₃C—HN—OC–⌬– | —CH₃ | —CN | —CH₃ | " |
| 6. | (H₃C)₂N—OC–⌬– | —CH₃ | —CN | —CH₃ | " |
| 7. | (H₃C)₂N—O₂S–⌬– | —CH₃ | —CN | —CH₃ | " |
| 8. | H₂N—O₂S–⌬– | —CH₃ | —CN | —CH₃ | " |
| 9. | H₃C—HN—O₂S–⌬– | —CH₃ | —CN | —CH₃ | " |
| 10. | (H₃C)₂N—O₂S–⌬– | —CH₃ | —CN | —CH₃ | " |
| 11. | ⌬–HN—O₂S–⌬– | —CH₃ | —CN | —CH₃ | " |
| 12. | H₂N—O₂S–⌬– | —CH₃ | —CN | —CH₃ | " |

TABLE 4-continued

R—N=N— [pyridone structure with X, Y, Z, HO, N-Z, =O]

| No. | R | X | Y | Z | Shade on Polyester |
|---|---|---|---|---|---|
| 13. | H₃C\N—O₂S—⟨C₆H₄⟩—CH₃ / H₃C | —CH₃ | —CN | —CH₂—CH₂—CH₂—O—CH₃ | " |
| 14. | H₂C\N—O₂S—⟨C₆H₄⟩—CH₃ / H₂C (ring) | —CH₃ | —CN | —CH₂—CH₂—CH₂—CH₃ | " |
| 15. | H₃C\N—O₂S—⟨C₆H₄⟩—CH₃ / H₃C | —CH₃ | —CN | —⟨C₆H₅⟩ | " |
| 16. | H₃C\N—OC—⟨C₆H₄⟩—CH₃ / H₃C | —CH₂—CH₃ | —CN | —CH₃ | " |
| 17. | H₂N—O₂S—⟨C₆H₄⟩— | —⟨C₆H₅⟩ | —CN | —CH₃ | " |
| 18. | H₃C\N—O₂S—⟨C₆H₄⟩—CH₃ / ⟨C₆H₅⟩ | —CH₃ | —CN | —CO—CH₃ | " |
| 19. | H₃C\N—O₂S—⟨C₆H₄⟩—CH₃ / H₃C | —CH₃ | —NO₂ | —CH₃ | " |
| 20. | H₃C\N—O₂S—⟨C₆H₄⟩—CH₃ / H₃C | —CH₃ | —NO | —CH₃ | " |

What is claimed is:

1. A monoazo dye of the formula

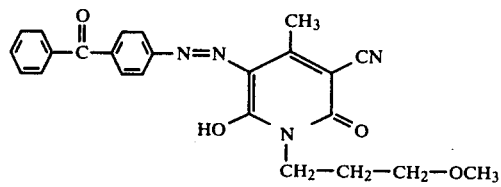

* * * * *